UNITED STATES PATENT OFFICE.

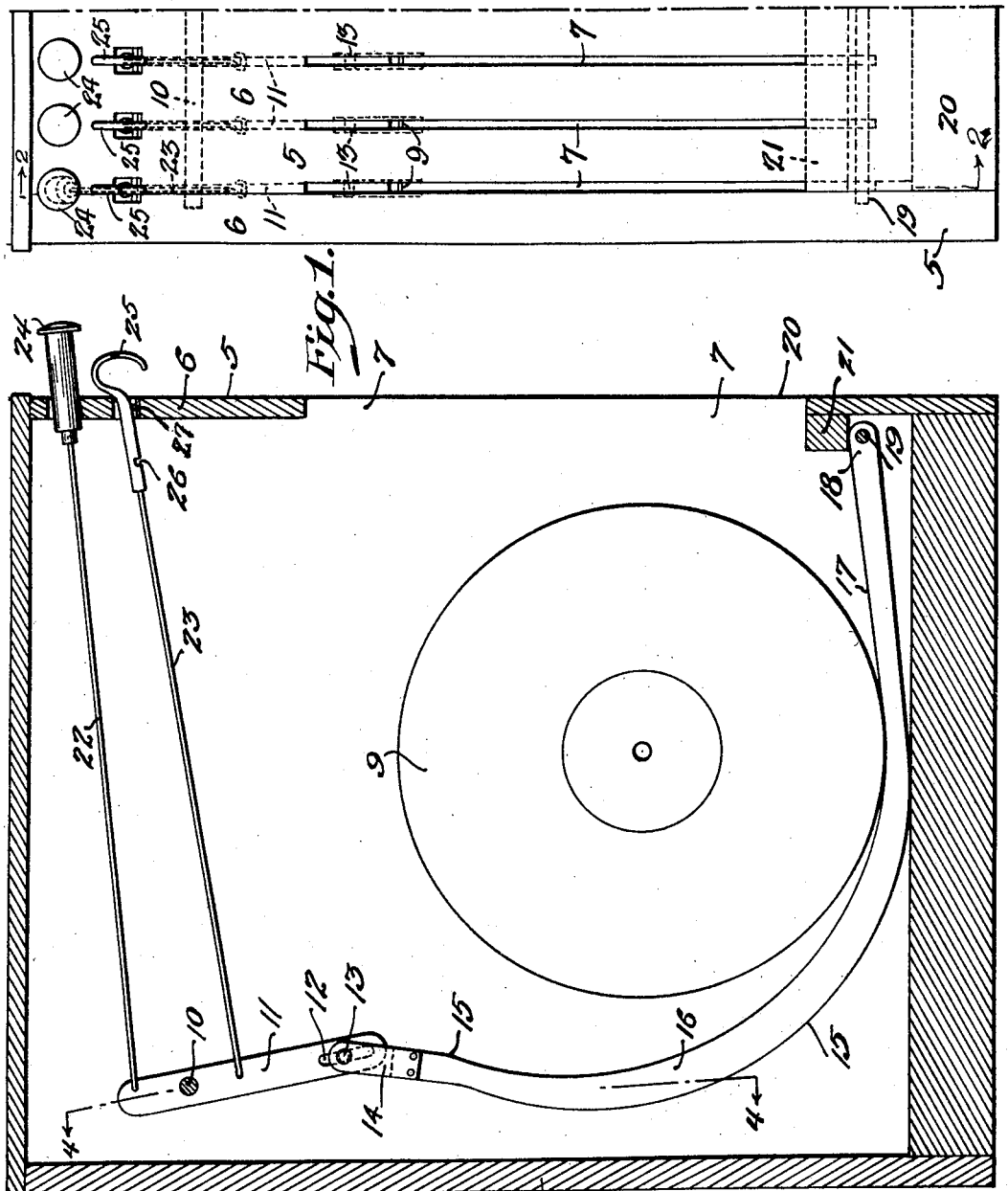

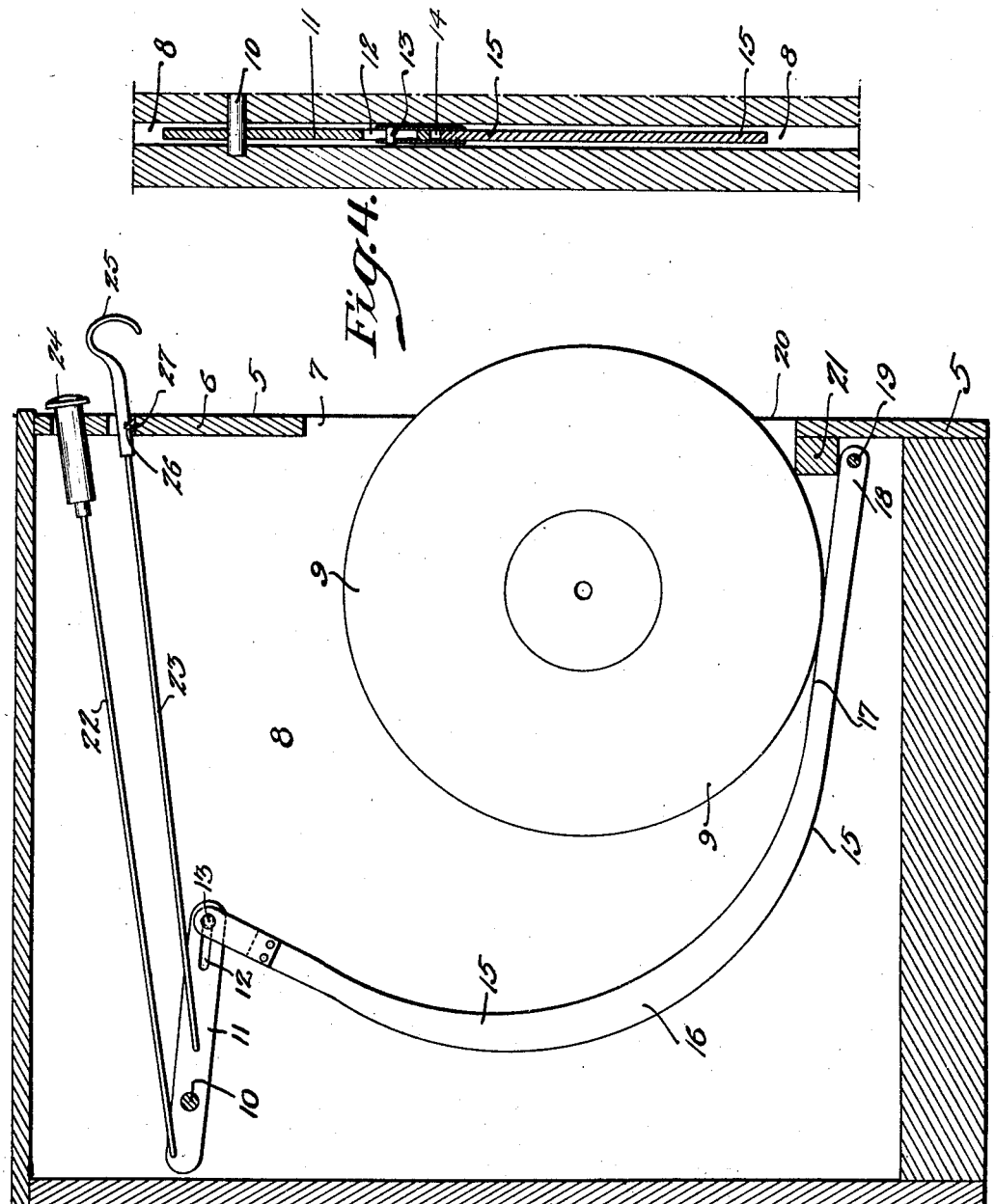

GEORGE J. WILLIAMS, OF CAMDEN, NEW JERSEY, ASSIGNOR OF ONE-HALF TO WILLIAM T. VAUGHAN, OF PHILADELPHIA, PENNSYLVANIA.

TALKING-MACHINE-RECORD-DISPENSING APPARATUS.

1,385,652.     Specification of Letters Patent.     Patented July 26, 1921.

Application filed August 18, 1920. Serial No. 404,303.

*To all whom it may concern:*

Be it known that I, GEORGE J. WILLIAMS, a citizen of the United States, residing at Camden, in the county of Camden and State of New Jersey, have invented certain new and useful Improvements in Talking-Machine - Record - Dispensing Apparatus, of which the following is a specification.

One object of my invention is to provide improved means which can be placed within a cabinet in which talking machine records are stored and which can be easily and quickly operated to dispense the records so that any one of the records within the cabinet may be readily had.

Another object is to make the apparatus of my invention of a durable and simple construction.

These objects, and other advantageous ends which will be described hereinafter, I attain in the following manner, reference being had to the accompanying drawings in which—

Figure 1 is a fragmentary front elevation of a part of a talking machine record cabinet including record dispensing apparatus made in accordance with my invention, Fig. 2 is a section taken on the line 2—2 of Fig. 1 and showing the parts in their normal positions and also showing a disk record in its normal position within the cabinet and resting upon a cradle support which forms a part of my invention.

Fig. 3 is a view of the same general character as Fig. 2 showing my improved apparatus having been operated to cause said record to roll by gravity into a position partly projecting beyond the forward surface of the cabinet, and Fig. 4 is a fragmentary section taken on the line 4—4 of Fig. 2.

Referring to the drawings, 5 represents a cabinet having a front board or panel 6 immediately above an opening 7 in the front of said cabinet. The cabinet is preferably divided into upright compartments 8 by partitions and each compartment is preferably provided with one of the units of the apparatus of my invention; it being noted that each compartment is adapted to receive a talking machine disk record such as shown at 9; said records being adapted to be moved into and out of the cabinet through the opening 7.

A pivot rod 10 extends through the compartments and each unit of my improved apparatus includes a lever 11 which is pivoted between its ends on the rod 10 so as to be free to swing thereon. One end of the lever 11 has an elongated slot 12 through which a pin 13 extends; said pin being adapted to pivotally connect the upper yoked end 14 of a cradle support 15, said cradle support being in the form of a curved strip; the yoked end 14 straddling the end of the lever 11 and the pin 13 serving to pivotally secure the cradle support 15 to the lever 11 but to permit movement between the lever and the cradle support to the extent of the length of the slot 12. The cradle support 15 includes an arcuate portion 16 and a straight portion 17; said straight portion 17 extending to the opposite end 18 of the cradle support which is pivoted on a pivot rod 19 which extends transversely through the cabinet. It will thus be noted that each of the compartments includes a lever 11 and a cradle support 15 connected thereto and the cradle support in its normal position as shown in Fig. 2 is adapted to support a record 9; said record resting with its peripheral edge upon the upper edge of the cradle support 15. When the cradle support is in its normal position as shown in Fig. 2 the straight portion 17 thereof extends downwardly and rearwardly at an incline and it is impossible for the record to accidentally roll forward. However, it is obvious that if the cradle support 15 is moved upwardly on the rod 19 as a pivot until the portion 17 declines forwardly that the record 9 will roll by gravity on the top edge surface of the portion 17 of the cradle support 15 until a portion of the record projects beyond the front surface 20 of the cabinet and the record can be easily withdrawn by hand from said latter position. I preferably insert a bar 21 adjacent the bottom of the opening 7 to form a stop for the record so that the record will roll into the position as shown in Fig. 3 but will not accidentally roll entirely out of the opening.

I may employ any suitable means to rock the lever 11 on the pivot rod 10 and as illustrated I have shown an arrangement with which the lever 11 can be easily swung from the position shown in Fig. 2 to the position shown in Fig. 3 to cause the record to roll forwardly as above described. For example I connect a push rod 22 to the lever 11 at a position above the pivot rod 10 and I may also connect a pull rod 23 to the lever 11 below the pivot rod 10; both of the rods 22 and 23 extending forwardly out of holes in the front part or panel 6. The push rod 22 at its forward end is preferably provided with a push button 24 and the pull rod at its forward end is preferably provided with a finger-engaging hook 25. Furthermore the forward end of the pull rod is preferably provided with a notch 26 adapted to engage over a lug 27 when the parts are moved into the position shown in Fig. 3. By having the rods 22 and 23 arranged as specified the lever 11 can be easily swung from the position shown in Fig. 2 into the position shown in Fig. 3 by grasping one finger of the hand within the hook 25 and pushing by the thumb of the same hand upon the push button 24. Thus by a rolling action of the hand a pushing and pulling action is simultaneously effected and the cradle support 15 will be raised on the rod 19 as a pivot so as to cause the record to roll from the position shown in Fig. 2 to the position shown in Fig. 3. After the hook 25 has been pulled outwardly the notch 26 will engage the lug 27 and the cradle support may be retained in its raised position until the record is again replaced thereon by projecting it inwardly through the opening 7, after which by a slight upward movement of the hook 25 the cradle support 15 will move downwardly by gravity and the record will roll into its normal position such for example as shown in Fig. 2.

While I have described but a single unit of my invention in detail, it will be noted that any number of these units may be included within a cabinet.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination of a record cabinet including means providing a compartment and having an opening leading outwardly from said compartment; a cradle support pivotally mounted at its lower forward portion in said compartment and having its rear portion, opposite said opening, extending upwardly whereby a record can be supported edgewise on said cradle support and a part of said cradle support will be positioned to the rear of said record; a pivotally mounted lever; means providing a pin and slot connection between said lever and the upper portion of the rear of said cradle support; and means extending to the outside of said cabinet and attached to said lever whereby said lever can be freely swung on its pivot to raise said support on its pivot to cause said record to roll outwardly on the lower portion of said cradle support.

2. The combination of a record cabinet including means providing a compartment and having an opening leading outwardly from said compartment; a record support within said compartment and adapted to move into a predetermined position to cause a record, supported thereon, to be projected out of said opening; a lever pivoted between its ends and in pivotal connection with said record support whereby when the lever is swung on its pivot it will operate to move said support into said position; and two rods connected to said lever at opposite sides of its pivot, one of said rods having a hook, the other having a button positioned relatively close whereby when the finger of one hand is used to pull the hook, the thumb or another finger of the same hand can be employed to push said button and thereby effect said pivotal movement of the lever.

In testimony whereof I have signed my name to this specification in the presence of two subscribing witnesses.

GEORGE J. WILLIAMS.

Witnesses:
 CHAS. E. POTTS,
 GEO. A. GRUSS.